United States Patent
Chung

(10) Patent No.: US 7,359,140 B2
(45) Date of Patent: Apr. 15, 2008

(54) METHOD AND APPARATUS OF ACCELERATION-BASED TRACK SEEKING SERVO CONTROL OF DISK DRIVE

(75) Inventor: Da-woon Chung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/848,167

(22) Filed: May 19, 2004

(65) Prior Publication Data

US 2004/0233569 A1 Nov. 25, 2004

(30) Foreign Application Priority Data

May 19, 2003 (KR) .................. 10-2003-0031540

(51) Int. Cl.
*G11B 5/596* (2006.01)
(52) U.S. Cl. .................. 360/78.06; 360/78.09; 318/560
(58) Field of Classification Search ............. 360/78.04, 360/78.06
See application file for complete search history.

(56) References Cited

U.S. PATENT DOCUMENTS

| | | | | |
|---|---|---|---|---|
| 4,937,689 A | * | 6/1990 | Seaver et al. ............ | 360/78.07 |
| 5,111,349 A | * | 5/1992 | Moon ....................... | 360/78.07 |
| 6,594,105 B1 | * | 7/2003 | Brittner ................... | 360/78.06 |
| 2002/0054450 A1 | | 5/2002 | Chu et al. | |
| 2003/0067710 A1 | * | 4/2003 | Kovinskaya et al. ...... | 360/78.06 |
| 2003/0189784 A1 | * | 10/2003 | Galloway ................ | 360/78.06 |

FOREIGN PATENT DOCUMENTS

| EP | 1 189 224 | 3/2002 |
|---|---|---|
| EP | 1 189 225 | 3/2002 |
| JP | 2001-325006 | 11/2001 |

* cited by examiner

*Primary Examiner*—Andrew L. Sniezek
(74) *Attorney, Agent, or Firm*—Staas & Halsey LLP

(57) ABSTRACT

A method and apparatus directed to acceleration-based track-seeking servo control of a disk drive, which minimize jerk generated at the start and end of track seeking, thereby reducing mechanical noise of the disc drive while shortening track-seek time. In the method directed to acceleration-based track seeking servo control of a disk drive, a transducer is moved to a target track by a track seeking control using an acceleration trajectory of a function where acceleration change is zero at the start and end of track seeking.

36 Claims, 10 Drawing Sheets

SEEK TIME

FIG. 9

| Seek Algorithm | Seek Time | Seek Performance |
|---|---|---|
| Bang-Bang Seek | $T_{SK} = \sqrt{\dfrac{4X_{SK}}{K_A I_M}}$ | 0.80 |
| Sinusoidal Seek | $T_{SK} = \sqrt{\dfrac{2\pi X_{SK}}{K_A I_M}}$ | 1.00 |
| Jerk Sinusoidal Seek | $T_{SK} = \sqrt{\dfrac{4nX_{SK}}{(n-2)K_A I_M}}$ | n=4,8,16,...., ∞<br>1.1, 0.92, 0.85,...,0.80 |

METHOD AND APPARATUS OF ACCELERATION-BASED TRACK SEEKING SERVO CONTROL OF DISK DRIVE

CROSS-REFERENCE TO RELATED APPLICATIONS

This application claims the priority of Korean Patent Application No. 2003-31540, filed on May 19, 2003, in the Korean Intellectual Property Office, the disclosure of which is hereby incorporated by reference in its entirety.

BACKGROUND OF THE INVENTION

1. Field of the Invention

The present invention relates to a method and an apparatus to control a disk drive, and more particularly, to a method and apparatus directed to acceleration-based track seeking servo control of a disk drive, to reduce noise and to shorten track-to-track seek time in the disk drive.

2. Description of the Related Art

A hard disk drive includes a plurality of magnetic transducers that write and read information by magnetizing and sensing a magnetic field of a single rotating disk or each of a plurality of rotating disks coated with a magnetic medium. The information is stored in a plurality of sectors located in an annular track. A track number is allocated across each surface of a disk, and a vertical set of tracks is called a cylinder. Thus, each track may be defined by a cylinder number.

Typically, each of the plurality of magnetic transducers is integrated into a slider incorporated into a head gimbal assembly (HGA). Each HGA is attached to an actuator arm having a voice coil located adjacent to a magnetic assembly which together defines a voice coil motor. The hard disk drive typically includes a driving circuit and a controller that supply current to excite the voice coil motor. The excited voice coil motor rotates the actuator arm and moves the transducers across the surface of disk(s).

When writing or reading information, the hard disk drive performs a seek routine to move the transducers from one cylinder to another cylinder. During the seek routine, the voice coil motor is excited by current to move the transducers to a new cylinder position across the surface of disk(s). The controller performs a servo routine to insure that the transducer follows on the center of a track.

A minimization of the amount of time required to read information from or writing information to disk(s) is desirable. Thus, the seek routine performed by the hard disk drive must move the transducers to the new cylinder position within a short time. Additionally, a settling period of the HGA must be minimized, so that the transducers can rapidly write or read information and move rapidly near the new cylinder position.

In general, seek servo control is performed by using a square wave acceleration trajectory, so as to quickly move the transducers to a target track. However, square waves include harmonics with high frequency characteristics, which causes mechanical resonance and excites mechanical elements or assemblies with high natural frequencies. Audible noise, undesired vibration, and an increase in the settling time of the HGA are caused due to residual vibration. The mechanical resonance introduced by square waves has a drawback in that both the settling time and the whole time required to write information to or read information from disk(s) are increased.

To solve such a problem, a seek control method using a sine wave acceleration trajectory has been proposed. An acceleration equation, a velocity equation, and a position equation are defined below.

$$a(t) = K_A I_M \sin\left(\frac{2\pi}{T_{SK}} t\right) \quad (1)$$
$$v(t) = \frac{K_A I_M T_{SK}}{2\pi}\left[1 - \cos\left(\frac{2\pi}{T_{SK}} t\right)\right]$$
$$x(t) = \frac{K_A I_M T_{SK}}{2\pi}\left[1 - \frac{T_{SK}}{2\pi}\sin\left(\frac{2\pi}{T_{SK}} t\right)\right],$$

where coefficients $K_A$, $I_M$, $T_{SK}$ denote an acceleration coefficient, a current amplitude, a track-seek time, respectively.

In comparison with the use of the square wave acceleration trajectory, the use of the sine wave acceleration trajectory leads to an increase of the track-seek time by about 10%. Also, when the sine wave acceleration trajectory is used according to Equation 1, mechanical noise and vibration are still caused due to jerk generated at the start and end of track seeking.

Here, the jerk indicates a differential value of the acceleration (the amount of acceleration change). In particular, the jerk, generated at the start and end of track seeking, causes mechanical noise and vibration.

When the square wave acceleration trajectory is used in track seeking, the jerk is unlimited at the start and end of track seek, as indicated in Equation 2.

$$|j(0)|=|j(T_{SK})|=\infty \quad (2)$$

When the sine wave acceleration trajectory is used in track seek, the jerk has a maximum value at the start and end of track see, as indicated in Equation 3.

$$j(t) = K_A I_M \frac{2\pi}{T_{sK}} \cos\left(\frac{2\pi}{T_{sK}}\right) \quad (3)$$
$$|j(0)| = |j(T_{sK})| = K_A I_M \frac{2\pi}{T_{sK}}$$

Therefore, seek servo control adopting the sine wave acceleration trajectory according to Equation 1 is improved in terms of the jerk when compared with seek servo control using the square wave acceleration trajectory. However, the seek servo using the sine wave acceleration trajectory causes a jerk equal to the maximum value of the sine waves at the start and end of track seek as indicated in Equation 3, which still results in mechanical noise and vibration.

Japanese Publication Patent No. 2001-325006 discloses a positioning device to reduce noise in positioning operations. The positioning device further reduces mechanical noise in a seek mode. This technique is characterized in that vibration and noise are reduced in track seeking by low pass filtering the acceleration trajectory, the velocity trajectory, and the position trajectory. However, since the LPF is additionally needed, the number of circuit elements increases. Moreover, since the jerk is not reduced to zero at the start and end of track seeking, the technique still results in mechanical noise and vibration.

SUMMARY OF THE INVENTION

The present invention provides a method and apparatus directed to acceleration-based track seeking servo control of a disk drive, in which an amount of jerk generated at the start and end of track seeking is minimized, thereby reducing mechanical noise while shortening a track-seek time.

According to one aspect of the present invention, there is provided a method directed to acceleration-based track seeking servo control of a disk drive, wherein a transducer is moved to a target track by a track seeking control using an acceleration trajectory of a function where acceleration change is zero at the start and end of track seeking.

According to another aspect of the present invention, there is provided a method directed to acceleration-based track seeking servo control of a disk drive, wherein a transducer is moved to a target track by a track seeking control that supplies to a voice coil a current of an acceleration function where acceleration change is zero at the start and end of track seeking.

According to still another aspect of the present invention, there is provided an apparatus directed to acceleration-based track-seeking servo control of a hard disk drive. The apparatus comprises a seek trajectory generator, a state estimator, a first summing unit, a position control gain compensator, a second summing unit, a velocity control gain compensator, a third summing unit, an acceleration control gain compensator, and an actuator.

The seek trajectory generator calculates a design position value, a design velocity value, and a design acceleration value by using an equation of an acceleration trajectory where acceleration change is zero at the start and end of track seeking in a track seek mode. The state estimator determines an actual position value, an actual velocity value, and an actual acceleration value used for a transducer to move across the hard disk drive. The first summing unit calculates a first difference between the actual position value and the design position value and outputs the subtraction value. The position control gain compensator multiplies the first difference output by the first summing unit by a predetermined position gain of position compensation to obtain a position compensation value. The second summing unit adds the design velocity value to the position compensation value, and calculates and outputs a second difference between the actual velocity value and the addition result. The velocity control gain compensator multiplies the second difference output by the second summing unit by a predetermined velocity gain of velocity compensation to obtain a velocity compensation value. The third summing unit adds the desired acceleration value to the velocity compensation value, and calculates and outputs a third difference between the actual velocity value and the addition result. The acceleration control gain compensator multiplies the third difference output by the third summing unit by a predetermined acceleration gain of acceleration compensation to obtain an acceleration compensation value. The actuator generates a current supplied to a voice coil in accordance with the acceleration compensation value.

According to yet another aspect of the present invention, there is provided a disk drive to which acceleration-based track seeking servo control is applied. The disk drive comprises a disk, a spindle motor, a transducer, an actuator, and a controller. The disk stores predetermined information. The spindle motor rotates the disk. The transducer writes information to and reads information from the disk. The actuator moves the transducer across a surface of the disk. The controller controls the actuator to move the transducer from a current track to a target track using an acceleration trajectory where acceleration change is zero at the start and end of track seeking in a track seek mode.

According to yet another aspect of the present invention, there is provided a disk drive to which acceleration-based track seeking servo control is applied. The disk drive comprises a disk, a spindle motor, a transducer, an actuator, and a controller. The disk stores predetermined information. The spindle motor rotates the disk. The transducer writes information to and reads information from the disk. The actuator moves the transducer across a surface of the disk. The controller controls the actuator to move the transducer from a current track to a target track by supplying a voice coil with current according to a function where an acceleration change is zero at the start and end of track seeking in a track seek mode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 9 is a table showing a comparison of seek performances of the present invention and related art.

DETAILED DESCRIPTION OF THE PREFERRED EMBODIMENTS

Figure 1:
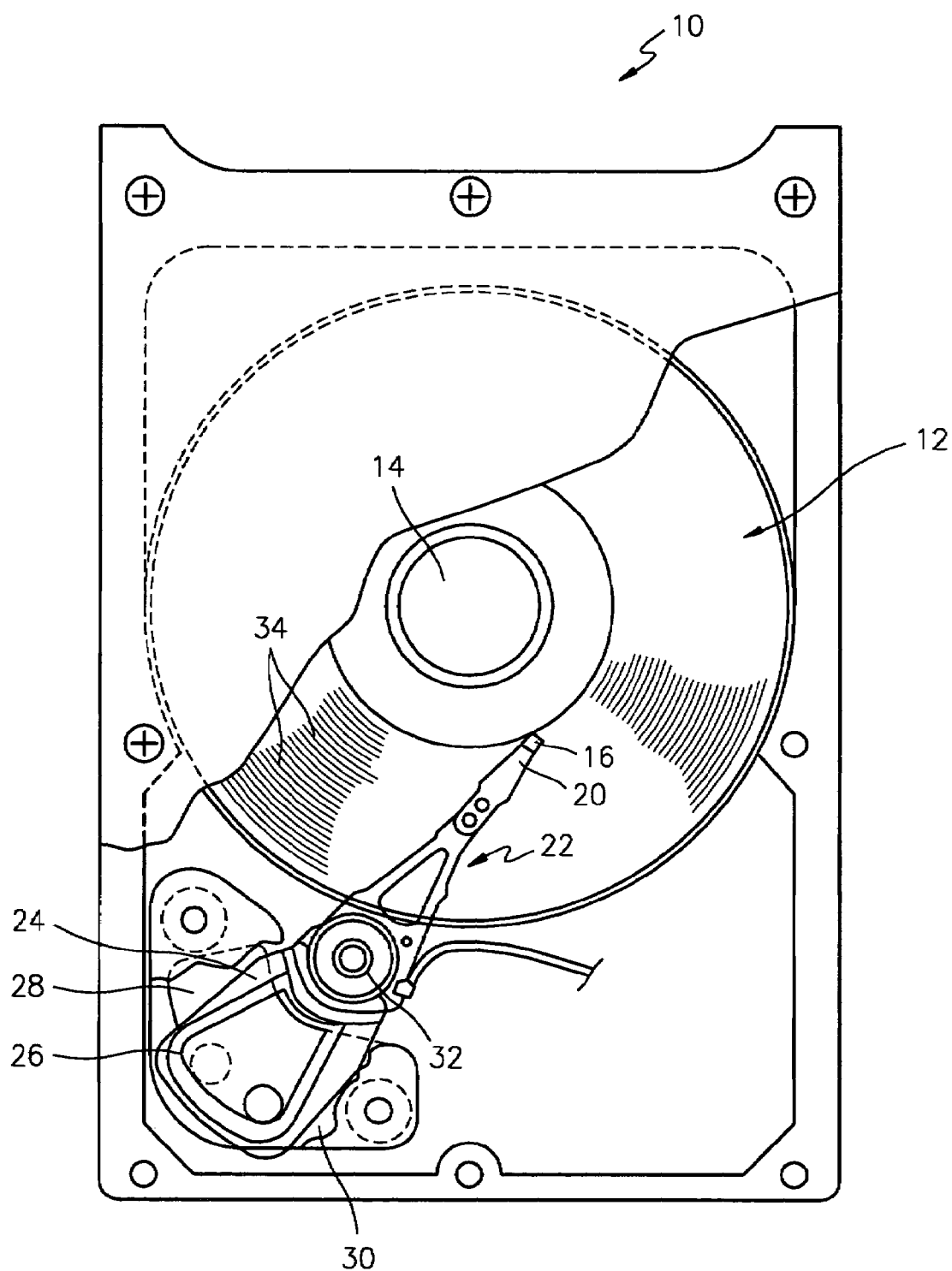
FIG. 1 is a plane view of a hard disk drive to which the present invention is applied.

Reference will now be made in detail to the embodiments of the present invention, examples of which are illustrated in the accompanying drawings, wherein like reference numerals refer to the like elements throughout. The embodiments are described below to explain the present invention by referring to the figures.

The objective of track-seeking servo control in a disk drive is to quickly move a head to a desired position while minimizing noise and vibration. A bang-bang seek controller using a square wave acceleration trajectory is beneficial to minimization of a track-seek time, but has a weak point in terms of noise and vibration. A sinusoidal seek controller using a sine wave acceleration trajectory has a strong point in terms of noise and vibration, but is inefficient in the use of current when compared with a seek controller using a square wave acceleration on trajectory. Indeed, when the sinusoidal seek controller is used, the track-seek time increases by 10%. In addition, both controllers cause jerk that results in mechanical noise and vibration generated at the start and end of track seeking.

As such, the purpose of the present invention is to make use of a new acceleration trajectory by which noise and vibration are reduced by minimizing the amount of jerk generated at the start and end of track seeking, thereby improving seek performance.

Figure 4:
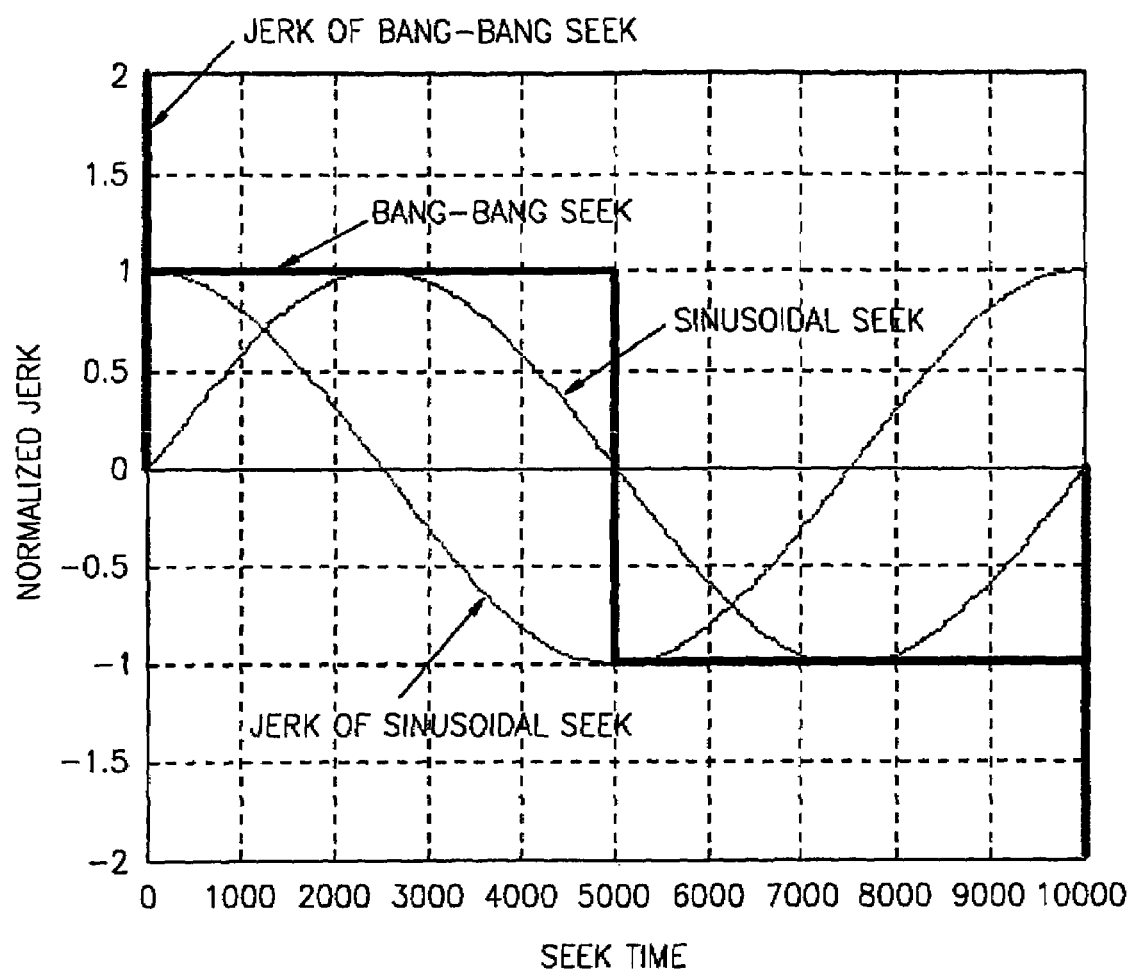
FIG. 4 illustrates an acceleration trajectory and a jerk trajectory according to prior art.
Figure 5:
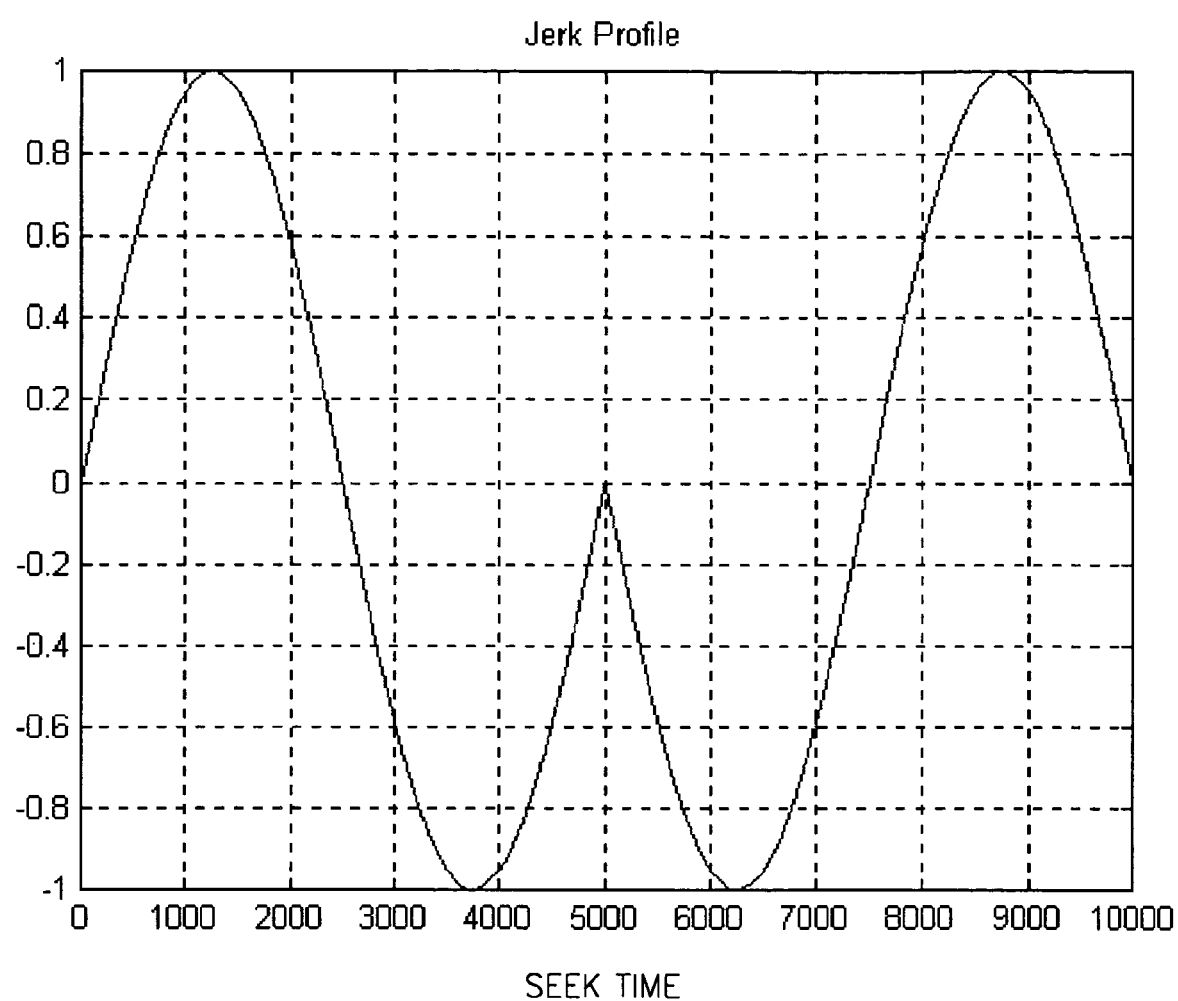
FIG. 5 illustrates a jerk trajectory used to create an acceleration trajectory in the form of acceleration/deceleration in a process of inducing the present invention.

The jerk denotes a sudden movement and represents a differential value of acceleration, i.e., the amount of acceleration change. As the jerk increases, the applied amount of shock per unit time increases. Thus, if the jerk is minimized at the start and end of track seeking, it is possible to reduce mechanical noise and vibration. In a case of the bang-bang seek controller shown in FIG. 4, unlimited jerk is generated. In a case of the sine wave acceleration trajectory, cosine wave jerk is generated, and thus, the jerk cannot be zero at the start and end of track seeking. To minimize the jerk at the start and end of track seeking when the acceleration trajectory is created, a sine wave jerk equation can be used as follows.

$$j(t) = K_A I_M \frac{2\pi}{T_{SK}} \sin\left(\frac{2\pi t}{T_{SK}}\right) \tag{4}$$

where $K_A$, $I_M$, and $T_{SK}$ represent an acceleration coefficient, a current amplitude, and a track seek time, respectively. To create the acceleration/deceleration form of the acceleration trajectory from Equation 4, Equation 4 can be changed into Equation 5 below. Thus, a jerk trajectory shown in FIG. 5 can be obtained.

$$j(t) = K_A I_M \frac{2\pi}{T_{SK}} \sin\left(\frac{2\pi}{T_{SK}/2} t\right) \text{sgn}(T_{SK}/2 - t) \tag{5}$$

Figure 6A:
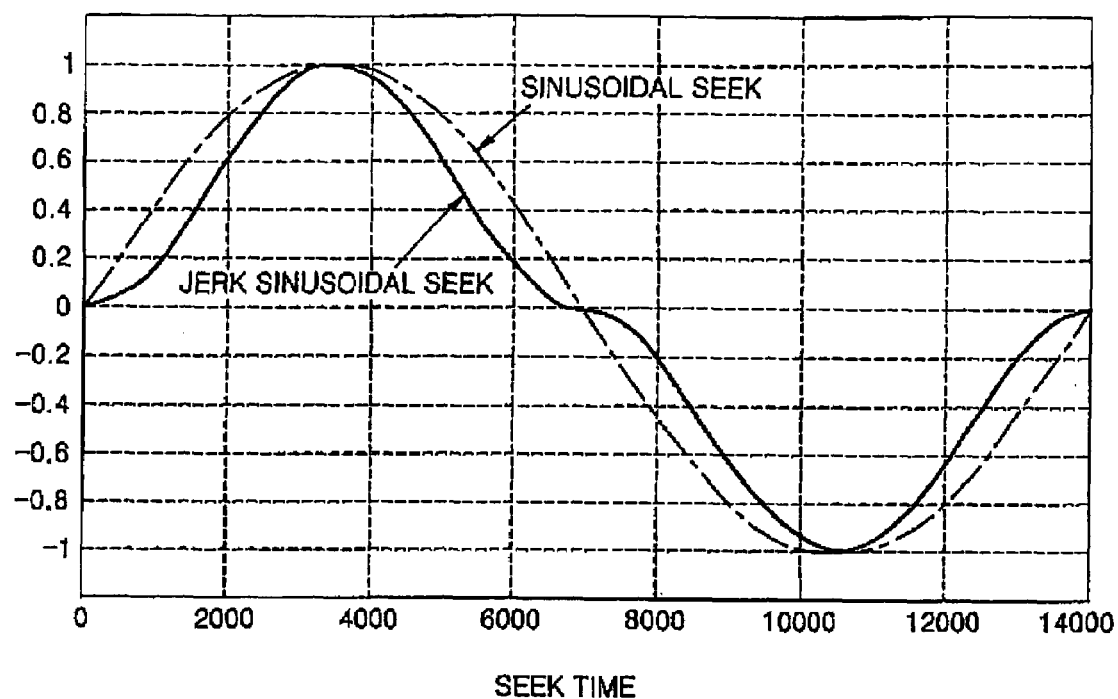
FIGS. 6A through 6C illustrate an acceleration trajectory, a velocity trajectory, and a position trajectory obtained using Equation 5.
Figure 6B:
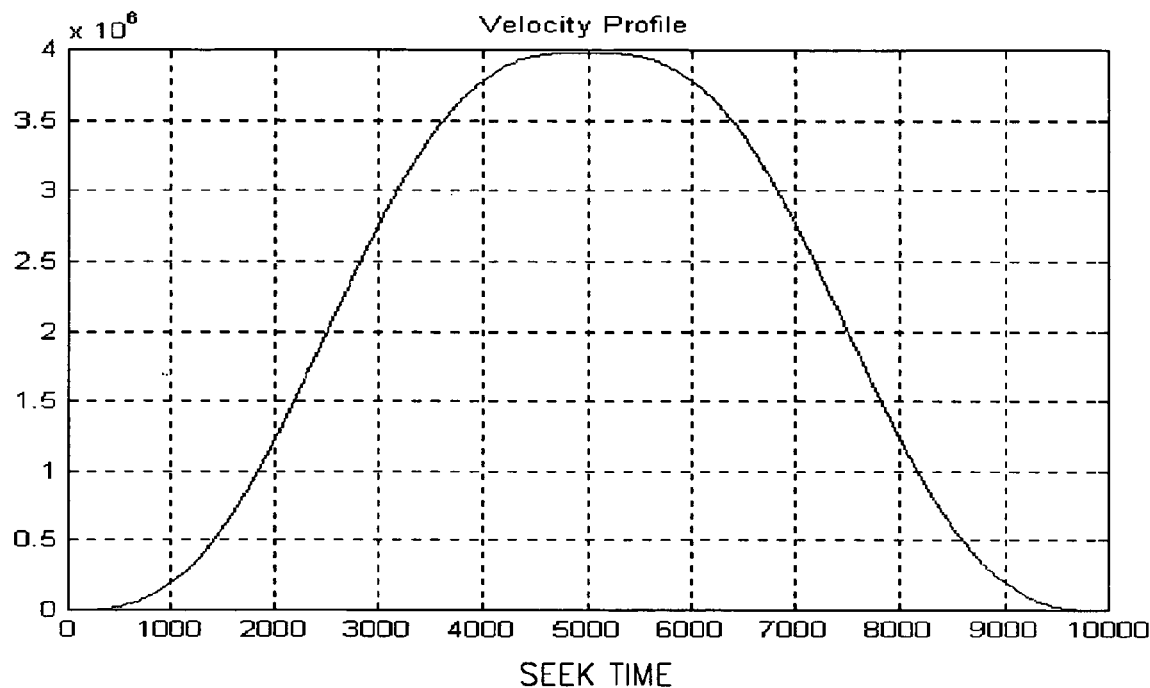
Figure 6C:
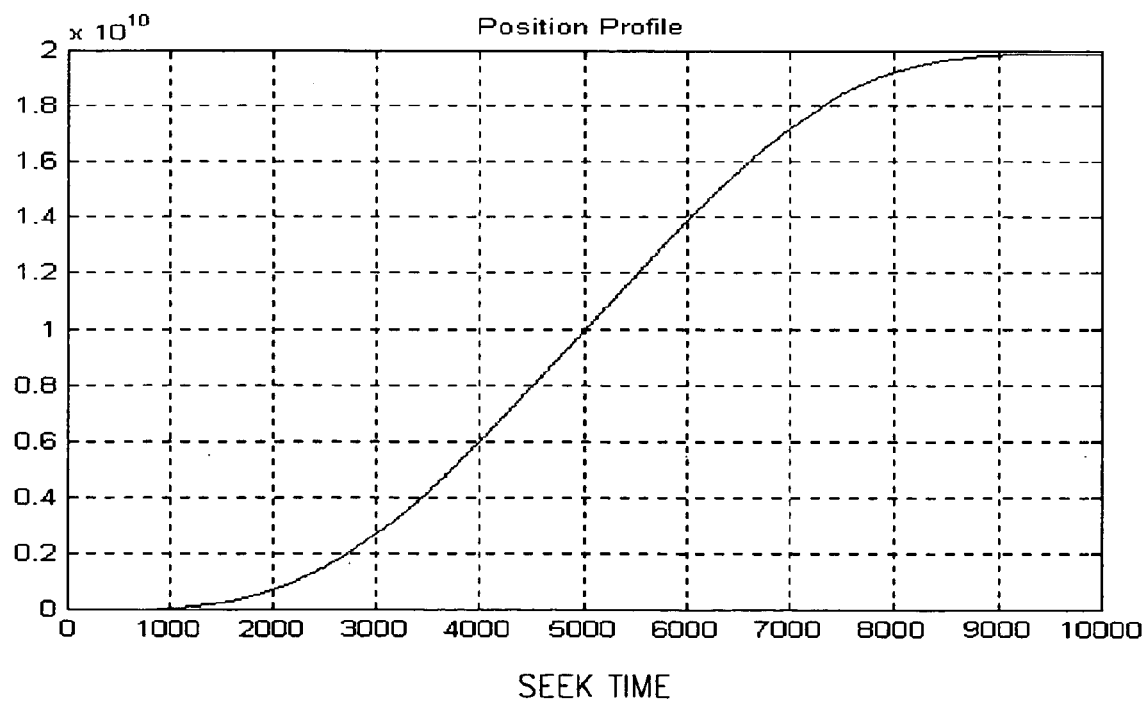

The acceleration trajectory, the velocity trajectory, and the position trajectory defined in Equation 6 are obtained by integrating Equation 5, and graphical representations of each of them is illustrated in FIGS. 6A through 6C.

$$a(t) = \frac{K_A I_M}{2}\left[1 - \cos\left(\frac{2\pi}{T_{SK}/2} t\right)\right] \text{sgn}(T_{SK}/2 - t) \tag{6}$$

$$v(t) = \frac{K_A I_M}{2}\left[1 - \frac{T_{SK}/2}{2\pi}\sin\left(\frac{2\pi}{T_{SK}/2}t\right)\right] \quad \text{if } t \le T_{SK}/2$$

$$= -\frac{K_A I_M}{2}\left[t - T_{SK} - \frac{T_{SK}/2}{2\pi}\sin\left(\frac{2\pi}{T_{SK}/2}t\right)\right] \quad \text{if } t > T_{SK}/2$$

$$x(t) = \frac{K_A I_M}{2}\left[\frac{t^2}{2} - \left(\frac{T_{SK}/2}{2\pi}\right)^2\left\{1 - \cos\left(\frac{2\pi}{T_{SK}/2}t\right)\right\}\right] \quad \text{if } t \le T_{SK}/2$$

$$= -\frac{K_A I_M}{2}\left[\frac{t^2}{2} - T_{SK}t + \left(\frac{T_{SK}}{2}\right)^2 - \left(\frac{T_{SK}/2}{2\pi}\right)^2\left\{1 - \cos\left(\frac{2\pi}{T_{SK}/2}t\right)\right\}\right] \quad \text{if } t > T_{SK}/2$$

The relationship between the seek time and the seek length can be obtained from the position trajectory equation of Equation 6 as follows.

$$X_{SK} = x(T_{SK}) = \frac{K_A I_M}{8} T_{SK}^2 \tag{7}$$

$$T_{SK} = \sqrt{\frac{8 X_{SK}}{K_A I_M}}$$

However, Equation 5 shows that the seek performance is decreased by approximately 10% when compared with a controller using the sine wave acceleration trajectory.

Therefore, in the present invention, Equation 5 is transformed as follows to illustrate the minimization of noise and vibration while improving the seek performance.

$$j(t) = K_A I_M \frac{2n\pi}{T_{SK}}\sin\left(\frac{2n\pi}{T_{SK}}t\right), \quad 0 < t < \frac{T_{SK}}{n}, \tag{8}$$

$$j(t) = 0, \quad \begin{array}{l} \frac{T_{SK}}{2} - \frac{T_{SK}}{n} < t < \frac{T_{SK}}{2} \\ \frac{T_{SK}}{n} < t < \frac{T_{SK}}{2} - \frac{T_{SK}}{2}, \\ \frac{T_{SK}}{2} + \frac{T_{SK}}{n} < t < T_{SK} - \frac{T_{SK}}{n} \end{array}$$

$$j(t) = -K_A I_M \frac{2n\pi}{T_{SK}}\sin\left(\frac{2n\pi}{T_{SK}}t\right), \quad \frac{T_{SK}}{2} < t < \frac{T_{SK}}{2} + \frac{T_{SK}}{n},$$

$$T_{SK} - \frac{T_{SK}}{n} < t < T_{SK},$$

where $K_A$, $I_M$, and $T_{SK}$ represent an acceleration coefficient, a current amplitude, and a track seek time, respectively.

Equation 8 is used to create a coast period where a specific amount of current is used in the middle of acceleration/deceleration periods in the acceleration trajectory. The specific amount of current varies with the length of the coast period.

Hereinafter, the apparatus directed to acceleration-based track-seeking servo control of a disk drive, according to the present invention will be described.

First, a hard disk drive 10 to which the present invention is applied will be described in FIG. 1.

The hard disk drive 10 includes at least one disk 12 rotated by a spindle motor 14. The hard disk drive 10 also includes a transducer 16 disposed adjacent to the surface of the disk 12.

The transducer 16 reads information from or writes information to the rotating disk 12 by sensing a magnetic field of the disk 12 and magnetizing the disk 12. Typically, the transducer 16 is associated with the surface of each disk 12. Although the transducer 16 is illustrated in FIG. 1 as a single body, it should be understood that the transducer 16 includes a write transducer to magnetize the disk 12 and a separate read transducer to sense the magnetic field of the disk 12. The read transducer is formed of magneto-resistive (MR) materials.

The transducer 16 may be incorporated into a slider 20. The slider 20 is structured such that an air bearing exists between the transducer 16 and the surface of the disk 12. The slider 20 is incorporated into a head gimbal assembly 22. The head gimbal assembly 22 is attached to an actuator arm 24 having a voice coil 26. The voice coil 26 is disposed adjacent to a magnetic assembly 28 that defines a voice coil motor (VCM) 30. The current supplied to the voice coil 26 generates torque that rotates the actuator arm 24 with respect to a bearing assembly 32. Rotation of the actuator arm 24 moves the transducer 16 across the surface of the disk 12.

Information is typically stored in annular tracks 34 of the disk 12. In general, each of the tracks 34 includes a plurality of sectors. Each of the sectors includes a data field and an identification field. The identification field is formed of a gray code that identifies a sector and a track (cylinder). The transducer 16 moves across the surface of the disk 12 to read information from or to write information to another track.

Next, the operation of an electric system of the hard disk drive 10 will be described.

Figure 2:
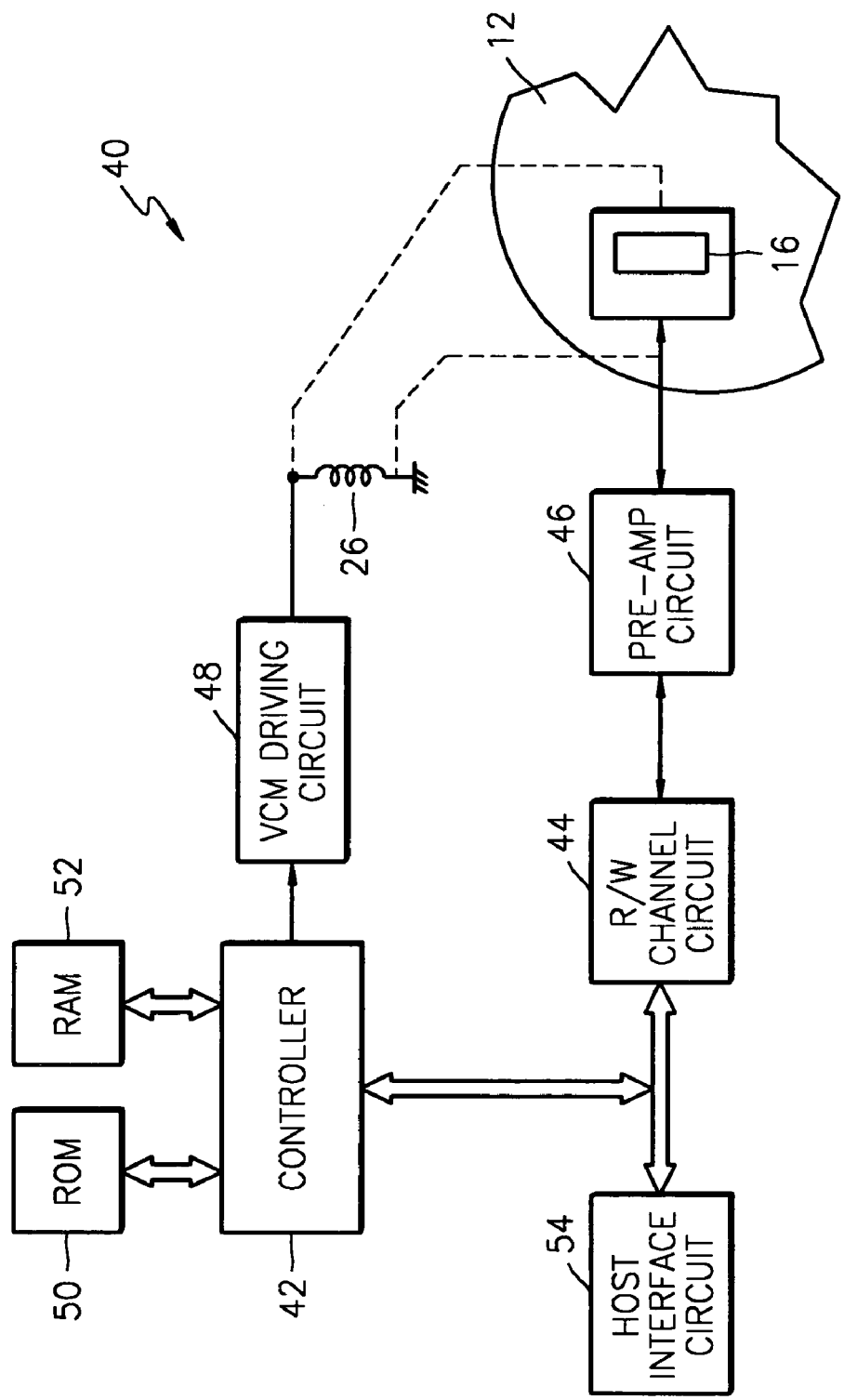
FIG. 2 is a circuit diagram of an electric system to control a hard disk drive to which the present invention is applied.

FIG. 2 illustrates an electric system 40 to control the hard disk drive 10. The electric system 40 includes a controller 42 that is coupled to the transducer 16 through a read/write (R/W) channel circuit 44 and a pre-amp circuit 46. The controller 42 may be a digital signal processor (DSP), a microprocessor, or a micro-controller. The controller 42 supplies a control signal to the RNV channel circuit 44 to read information from or write information to the disk 12. Information is typically transferred to a host interface circuit 54 from the R/W channel circuit 44. The host interface circuit 54 includes a buffer memory (not shown) and a control circuit (not shown) which allow the disk drive to interface with a system such as a personal computer.

The controller 42 is coupled to a VCM driving circuit 48 that supplies driving current to the voice coil 26. The controller 42 supplies a control signal to the VCM driving circuit 48 to control an excitation of the VCM 30 of FIG. 1 and movement of the transducer 16.

The controller 42 is coupled to a non-volatile memory such as a read-only memory (ROM) 50 or a flash memory element and a random access memory (RAM) device 52. The ROM device 50 and the RAM device 52 include commands and data used so that the controller 42 may implement a software routine. The software routine includes a seek routine that moves the transducer 16 from one track to another track. The seek routine includes a servo control routine to guarantee an accurate movement of the transducer 16 to a target track. As an embodiment, the ROM device 50 stores an acceleration trajectory equation, a velocity trajectory equation, and a position trajectory equation obtained from a jerk equation like Equation 8 where the acceleration change is zero at the start and end of a track-seek mode. As will be described below, such equations are loaded in the RAM device 52 at the beginning of a driving operation.

Figure 3:
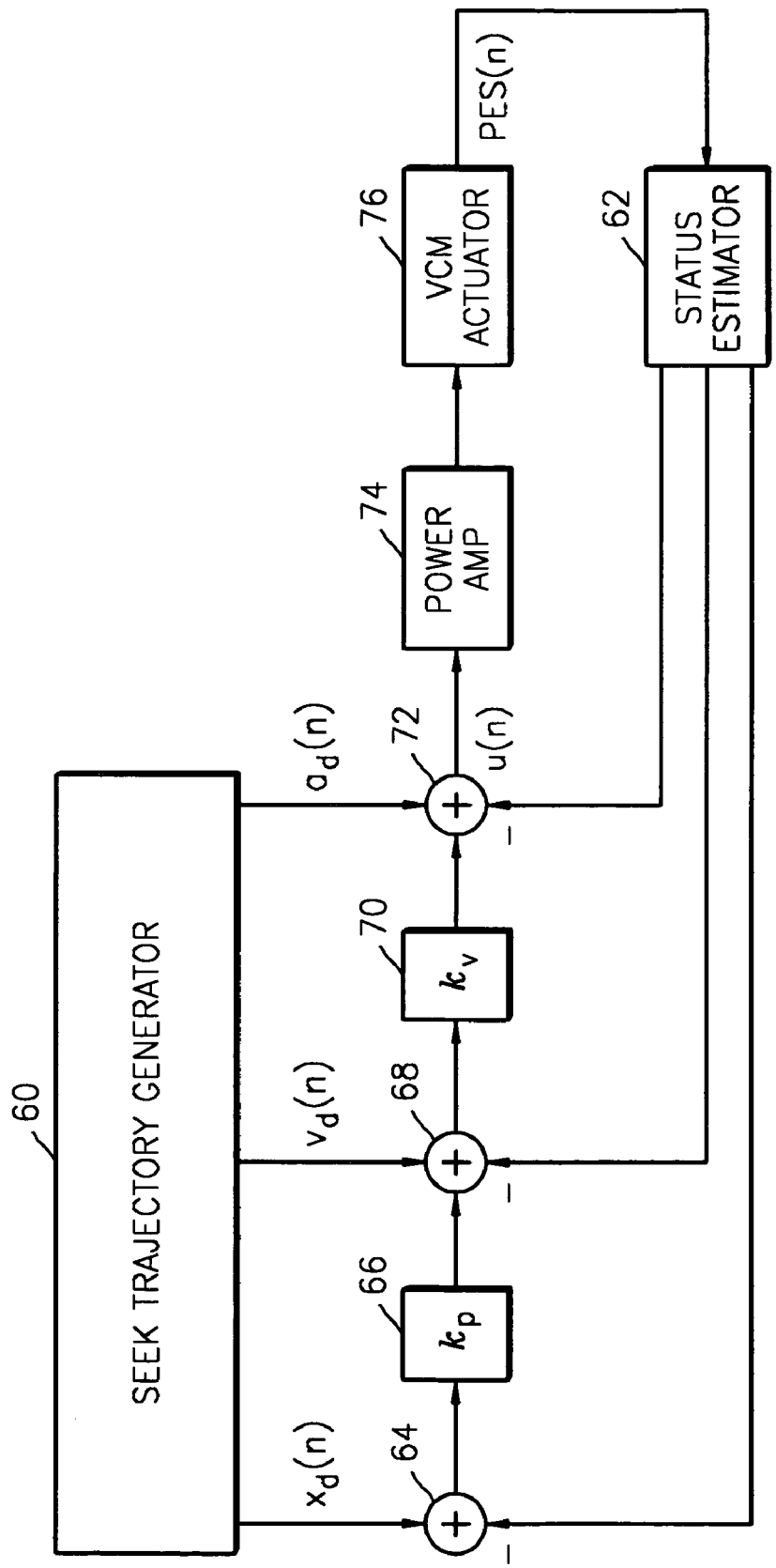
FIG. 3 is a circuit diagram of an apparatus directed to acceleration-based track-seeking servo control of a hard disk drive, according to the present invention.

FIG. 3 illustrates an apparatus directed to acceleration-based track-seeking servo control which is formed of hardware and software implemented by the controller 42, according to the present invention. The apparatus to provide track-seeking servo control directs the transducer 16 to accurately move to a target track of the disk 12. The controller 42 uses a seek routine to move the transducer 16 from a first track to a new track that is located apart from the first track by a horizontal distance $X_{SK}$. Gray codes of one or more tracks between the first track and the new track are read by the transducer 16 that moves across the surface of the disk 12. Based on the read gray codes, the controller 42 periodically determines whether the transducer 16 is moving at a desired velocity and at a desired acceleration.

The apparatus directed to track-seeking servo control includes a status estimator 62. The state estimator 62 can determine an actual position value of the transducer 16 or an actual distance that the transducer 16 has moved from the first track. The actual position value can be determined by the transducer 16 reading gray codes from a track just below the transducer 16. The state estimator 62 can also determine an actual velocity and an actual acceleration value of the transducer 16. In order for the controller 42 to accurately control movement of the transducer 16, gray codes are periodically extracted by moving the transducer 16 to a new track.

By using the acceleration trajectory induced from the jerk equation like Equation 8 whenever the transducer 16 reads gray codes from a track 34, a seek trajectory generator 60 calculates a design position $X_d$ (n), a design velocity $V_d$ (n), and a design acceleration $a_d$ (n) of the transducer 16 according to Equations 9 through 14.

A first summing unit 64 subtracts the actual position value from the design position $X_d$ (n). Then, a position control gain compensator 66 multiplies the difference between the actual position value and the design position $X_d$ (n), calculated in the first summing unit 64, by a position gain $k_p$ of position compensation to determine a position compensation value.

Next, a second summing unit 68 adds the design velocity $V_d$ (n) to the position compensation value created by the position control gain compensator 66 and then subtracts the actual velocity value from the addition result.

Then, a velocity control gain compensator 70 multiplies the difference between designing velocity $V_d$ (n) and the actual velocity value, calculated in the second summing unit 68, by a velocity gain $k_v$ of velocity compensation, to determine a velocity compensation value.

Next, a third summing unit 72 adds the velocity compensation value to the design acceleration $a_d$ (n) and subtracts the actual acceleration value from the addition result, to determine an acceleration compensation value (u(n)).

The acceleration compensation value is amplified by a power amp 74 and then applied to a VCM actuator 76. Then, the VCM actuator 76 changes the amount of current supplied to a voice coil with respect to the amplified acceleration compensation value, to change the acceleration of movement of the transducer 16. Therefore, the form of the acceleration trajectory and the form of the current trajectory applied to the voice coil are identical.

Figure 7:
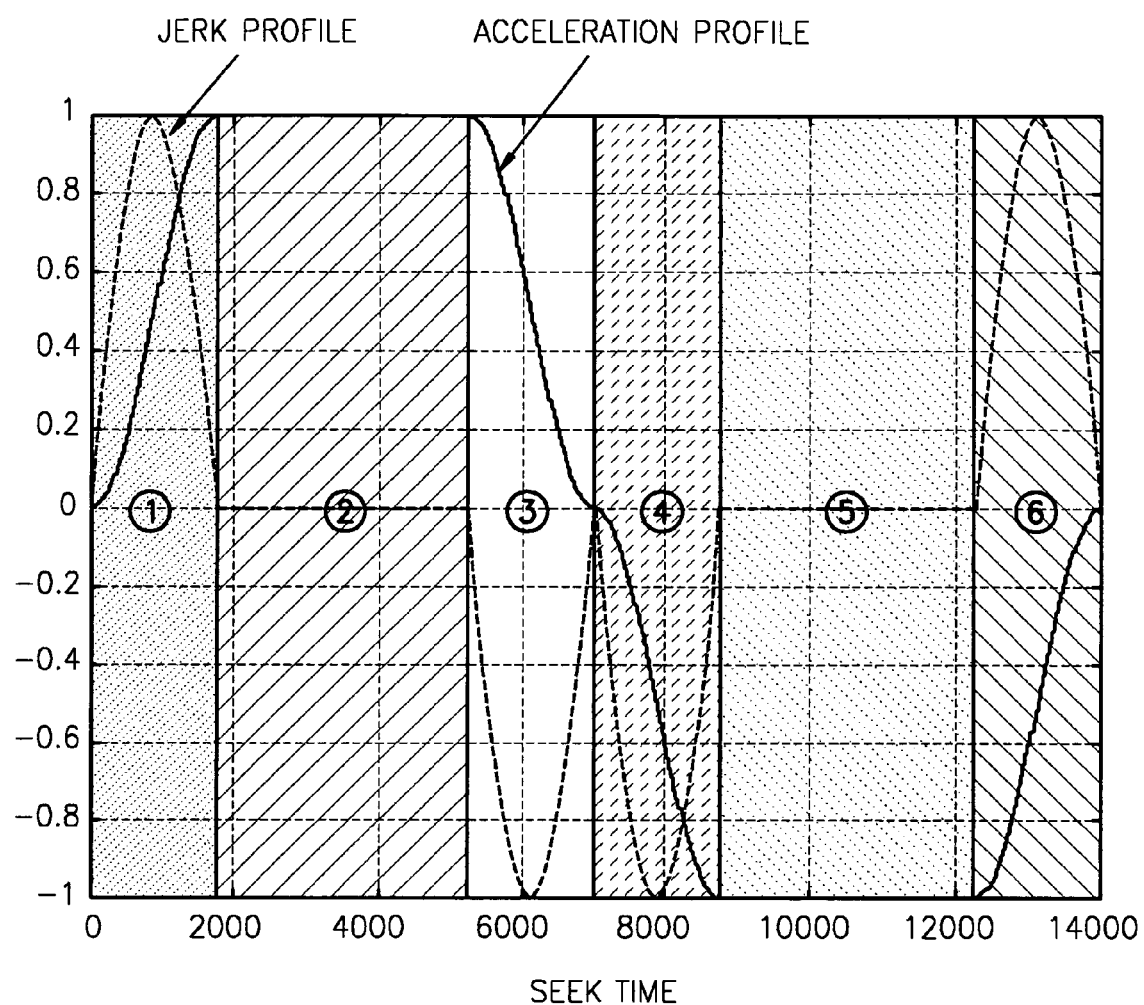
FIG. 7 illustrates an acceleration trajectory and a jerk trajectory used in acceleration-based track-seeking servo control of a disk drive, according to the present invention.

In other words, the current applied to the voice coil is equal to an acceleration value obtained by integrating a jerk equation where, as shown in FIG. 7, acceleration change (jerk value) is zero at the start and end of the track-seek mode (and/or a time point shortly after a track seeking start and shortly before a track seeking end) and acceleration change is zero during specific periods of an acceleration period and a deceleration period.

Equations expressing a design acceleration trajectory, a design velocity trajectory, and a design position trajectory supplied to the third summing unit 72, the second summing unit 68, and the first summing unit 64 are defined below.

A jerk trajectory of Equation 8 in the present invention and an acceleration trajectory induced from the jerk trajectory are shown in FIG. 7. As shown in FIG. 7, after the jerk trajectory is divided into six periods, an acceleration equation, a velocity equation, and a position equation are obtained for each period.

For convenience of explanation, $K_A I_M$ of Equation 8 is normalized to 1.

1) starting part of an acceleration period (period 1)

$$t = 0 \sim T_{SK}/n$$

$$\omega = n \frac{2\pi}{T_{SK}}$$

This period corresponds to a starting part of the acceleration period, and during this period, acceleration current increases. During this period, a jerk equation j(t), an acceleration equation a(t), a velocity equation v(t), and a position equation x(t) are defined as follows.

$$j(t) = \omega \sin(\omega t)/2 \quad (9)$$
$$a(t) = (1 - \cos(\omega t))/2$$
$$v(t) = (t - \sin(\omega t)/\omega)/2$$
$$x(t) = \left[\frac{t^2}{2} - (1 - \cos(\omega t))/\omega^2\right]\bigg/2$$

2) coast period of the acceleration period (period 2)

$$t = T_{SK}/n \sim (T_{SK}/2 - T_{SK}/n)$$

This period corresponds to a coast period of the acceleration period, and during this period, acceleration current is maintained at a specific level. During this period, an jerk equation j(t), an acceleration equation a(t), a velocity equation v(t), and a position equation x(t) are defined as follows.

$$j(t) = 0 \quad (10)$$
$$a(t) = 1$$
$$v(t) = t - \frac{T_{SK}}{2n}$$
$$x(t) = \frac{t^2}{2} - \frac{T_{SK}}{2n}t + \left(\frac{T_{SK}}{2n}\right)^2 - \left(\frac{1}{\omega}\right)^2$$

3) ending part of the acceleration period (period 3)

$$t = (T_{SK}/2 - T_{SK}/n) \sim T_{SK}/2$$

This period corresponds to an ending part of the acceleration period, and during this period, acceleration current decreases. During this period, a jerk equation j(t), an acceleration equation a(t), a velocity equation v(t), and a position equation x(t) are defined as follows.

$$j(t) = \omega \sin(\omega t)/2 \quad (11)$$
$$a(t) = (1 - \cos(\omega t))/2$$
$$v(t) = (t - \sin(\omega t)/\omega)/2 + \frac{T_{SK}}{4} - \frac{T_{SK}}{n}$$
$$x(t) = \left[\frac{t^2}{2} - (1 - \cos(\omega t))/\omega^2\right]\bigg/2 + \left(\frac{T_{SK}}{4} - \frac{T_{SK}}{n}\right)t + \frac{T_{SK}^2}{4n} - \frac{T_{SK}^2}{16}$$

4) starting part of a deceleration period (period 4)

$$t = T_{SK}/2 \sim (T_{SK}/2 + T_{SK}/n)$$

This period corresponds to a starting part of the deceleration period, and during this period, deceleration current increases. During this period, a jerk equation j(t), an acceleration equation a(t), a velocity equation v(t), and a position equation x(t) are defined as follows.

$$j(t) = -\omega \sin(\omega t)/2$$
$$a(t) = -(1 - \cos(\omega t))/2$$
$$v(t) = -(t - \sin(\omega t)/\omega)/2 + \frac{3T_{SK}}{4} - \frac{T_{SK}}{n}$$
$$x(t) = -\left[\frac{t^2}{2} - (1 - \cos(\omega t))/\omega^2\right]\bigg/2 + \left(\frac{3T_{SK}}{4} - \frac{T_{SK}}{n}\right)t + \frac{T_{SK}^2}{4n} - \frac{3T_{SK}^2}{16}$$

5) coast period of the deceleration period (period 5)

$$t = (T_{SK}/2n + T_{SK}/n) \sim (T_{SK} - T_{SK}/n)$$

This period corresponds to a coast period of the deceleration period, and during this period, deceleration current is maintained at a specific level. During this period, a jerk equation j(t), an acceleration equation a(t), a velocity equation v(t), and a position equation x(t) are defined as follows.

$$j(t) = 0 \quad (13)$$
$$a(t) = -1$$
$$v(t) = -t + T_{SK} - \frac{T_{SK}}{2n}$$
$$x(t) = -\frac{t^2}{2} + T_{SK}t - \frac{T_{SK}}{2n}t - \left(\frac{T_{SK}}{2}\right)^2 - \left(\frac{T_{SK}}{2n}\right)^2 + \left(\frac{1}{\omega}\right)^2$$

6) ending part of the deceleration period (period 6)

$$t = (T_{SK} - T_{SK}/n) \sim T_{SK}$$

This period corresponds to an ending part of the deceleration period, and during this period, acceleration current decreases. During this period, a jerk equation j(t), an acceleration equation a(t), a velocity equation v(t), and a position equation x(t) are defined as follows.

$$j(t) = -\omega \sin(\omega t)/2 \quad (14)$$
$$a(t) = -(1 - \cos(\omega t))/2$$
$$v(t) = -(t - \sin(\omega t)/\omega)/2 + \frac{3T_{SK}}{4} - \frac{T_{SK}}{n}$$
$$x(t) = -\left[\frac{t^2}{2} - (1 - \cos(\omega t))/\omega^2\right]\bigg/2 + \left(\frac{3T_{SK}}{4} - \frac{T_{SK}}{n}\right)t + \frac{T_{SK}^2}{4n} - \frac{3T_{SK}^2}{16}$$

In a case where seek servo control is performed using the acceleration trajectory obtained by applying the jerk equation of Equation 8, an equation with respect to the relationship between a seek time and a seek length is defined below.

$$T_{SK} = \sqrt{\frac{4nX_{SK}}{(n-2)K_A I_M}} \quad n \geq 4, \quad (15)$$

where n is the number of equal acceleration/deceleration intervals in the seek period. Here, n must be equal to or more than 4. For convenience of calculation, the length of the coast period is equal to the length of an interval. However, the length of the coast period may be decided differently.

It can be seen in Equation 9 that as n increases to 4, 8, and 16, the seek performance is improved by—10%, 8%, and 13.5%, respectively when compared with the sinusoidal seek servo.

Figure 8:
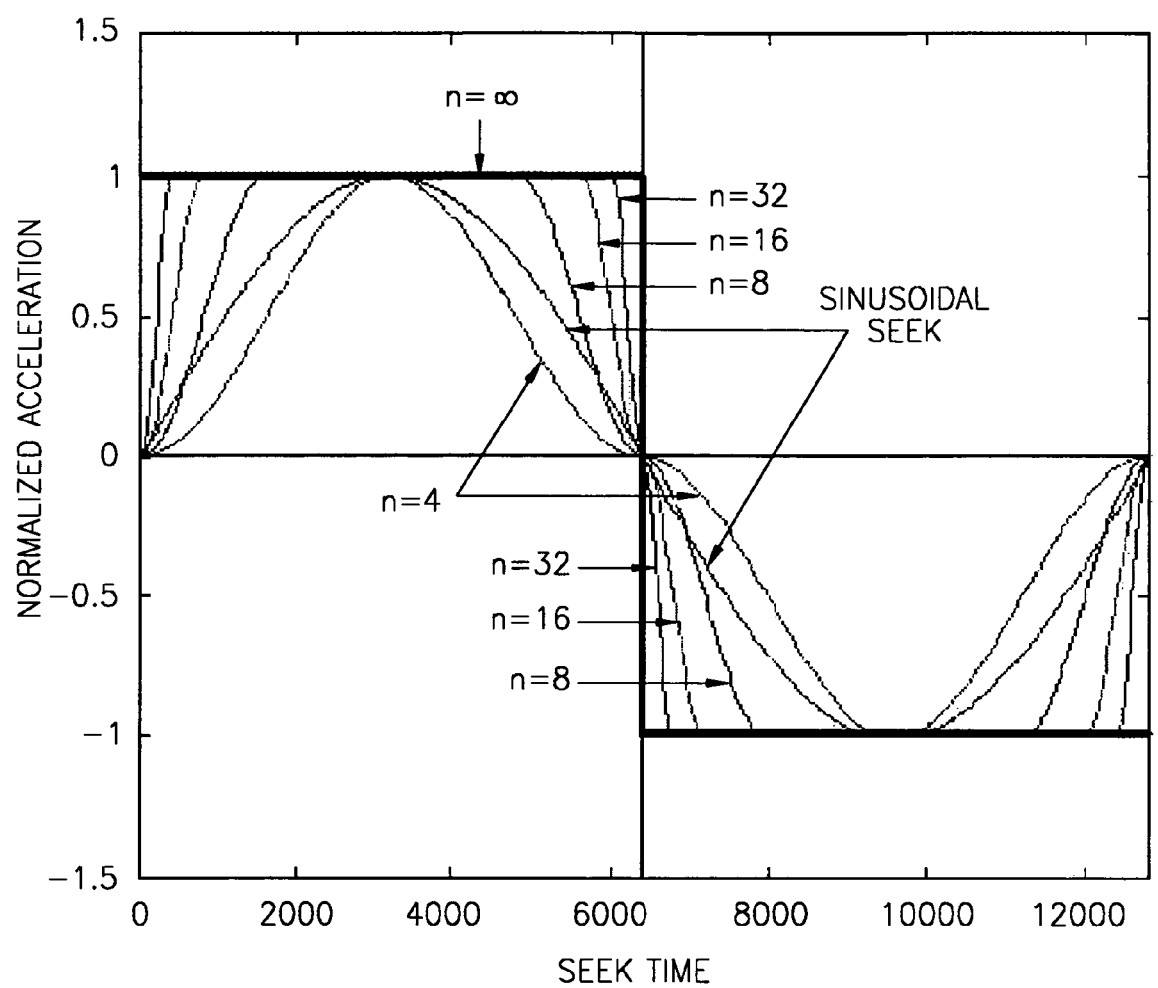
FIG. 8 illustrates an acceleration trajectory for different n (number of intervals of a seek period), used in acceleration-based track-seeking servo control of a disk drive according to the present invention, with respect to n.

FIG. 8 illustrates an acceleration trajectory using the jerk equation of Equation 8 as n increases. As can be seen in FIG. 8, as n increases, the acceleration trajectory approaches the square wave acceleration trajectory.

FIG. 9 is a table showing a comparison of the seek performance for a jerk sinusoidal seek using the acceleration trajectory obtained from Equation 8 for different n values, a bang-bang seek using the square wave acceleration trajectory, and a sinusoidal seek using the sine wave acceleration trajectory.

As shown in the table of FIG. 9, the jerk sinusoidal seek according to the present invention reduces the seek time when compared with track seeking using the sine waves, while minimizing mechanical vibration and noise.

As described above, according to the present invention, a transducer is moved to a target track by using an acceleration trajectory of a function where acceleration change is zero at the start and end of a track seek mode in a track seek control of a disk drive. Thus, it is possible to reduce a track seek time when compared with a conventional track seeking technique using a sine wave acceleration trajectory, while minimizing mechanical vibration and noise.

The present invention may be implemented as a method, an apparatus, and a system. When the present invention is implemented by software, components of the present invention are code segments that execute necessary operations. Programs or code segments may be stored in a processor readable medium or may be transmitted by a transmission medium or a computer data signal that is coupled to carrier waves over a communication network. The processor readable medium includes any media capable of storing or transmitting information. For example, the processor readable media may be an electric circuit, a semiconductor memory device, a read only memory (ROM), a flash memory, an erasable ROM (EROM), a floppy disk, an optical disk, a hard disk, an optical fiber medium, a radio frequency (RF) network, or the like. The computer data signal includes any signal that can be transmitted over an electric network channel, an optical fiber, air, an electric field, an RF network, or the like.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of acceleration-based trajectory seeking servo control of a disk drive, comprising moving a transducer along a target trajectory by a trajectory seeking control using an acceleration trajectory, wherein a profile of the acceleration trajectory includes an acceleration period, as a track seeking start part, followed by a deceleration period, as a track seeking end part, with the acceleration period including a period where acceleration change according to time becomes and is maintained at zero after proceeding along the target trajectory with a sinusoidally changing acceleration and with the deceleration period including a period where deceleration change according to time becomes and is maintained at zero before proceeding along the target trajectory with a sinusoidally changing deceleration.

2. The method of claim 1, wherein the acceleration trajectory, as characterized by the acceleration period and the deceleration period, is symmetrical.

3. The method of claim 1, wherein the period of the acceleration period is a first period of the acceleration period and the acceleration period further comprises a second period following the maintenance of the zero acceleration change after the first period, with the second period proceeding along the target trajectory with a sinusoidal acceleration change to become a zero acceleration before the deceleration period.

4. A method of acceleration-based track seeking servo control of a disk drive, comprising moving a transducer to a target track by a track seeking control using an acceleration trajectory of a function where acceleration change is zero at the start and end of track seeking wherein a profile of the acceleration trajectory includes an acceleration period and a deceleration period, each including a period where acceleration change is zero, wherein the acceleration trajectory is obtained by integrating a jerk equation j(t) as follows, $$j(t) = K_A I_M \frac{2n\pi}{T_{SK}} \sin\left(\frac{2n\pi}{T_{SK}} t\right), \ 0 < t < \frac{T_{SK}}{n}, \ \frac{T_{SK}}{2} - \frac{T_{SK}}{n} < t < \frac{T_{SK}}{2}$$

$$j(t) = 0, \ \frac{T_{SK}}{n} < t < \frac{T_{SK}}{2} - \frac{T_{SK}}{n}, \ \frac{T_{SK}}{2} + \frac{T_{SK}}{n} < t < T_{SK} - \frac{T_{SK}}{n}$$

$$j(t) = -K_A I_M \frac{2n\pi}{T_{SK}} \sin\left(\frac{2n\pi}{T_{SK}} t\right), \ \frac{T_{SK}}{2} < t < \frac{T_{SK}}{2} + \frac{T_{SK}}{n},$$

$$T_{SK} - \frac{T_{SK}}{2} < t < T_{SK}$$

where $K_A$, $I_M$ and $T_{SK}$ represent an acceleration coefficient, a current amplitude, and a track seek time, respectively, and n is a number of equal intervals into which the seek period is divided.

5. An apparatus of acceleration-based track-seeking servo control of a hard disk drive, having a transducer, the apparatus comprising:
   a seek trajectory generator to calculate a design position value, a design velocity value, and a design acceleration value by using an equation of an acceleration trajectory where acceleration change is zero at a start and an end of track seeking in a track seek mode;
   a state estimator to determine an actual position value, an actual velocity value, and an actual acceleration value used for the transducer to move across the hard disk drive;
   a first summing unit to calculate a first difference between the actual position value and the design position value;
   a position control gain compensator to multiply the first difference by a predetermined position gain for position compensation to obtain a position compensation value;
   a second summing unit to add the design velocity value to the position compensation value, and to calculate a second difference between the actual velocity value and the addition result;
   a velocity control gain compensator to multiply the second difference by a predetermined velocity gain for velocity compensation to obtain a velocity compensation value;
   a third summing unit to add the design acceleration value to the velocity compensation value, and to calculate a third difference between the actual velocity value and the addition result;
   an acceleration control gain compensator to multiply the third difference by a predetermined acceleration gain of acceleration compensation to obtain an acceleration compensation value; and
   an actuator to generate a current supplied to a voice coil in accordance with the acceleration compensation value.

6. The apparatus of claim 5, wherein the acceleration trajectory is characterized in that acceleration and deceleration are symmetrical.

7. The apparatus of claim 5, wherein a profile of the acceleration trajectory includes an acceleration period and a deceleration period, each including a period where acceleration change is zero.

8. A disk drive comprising:
a disk to store predetermined information;
a spindle motor to rotate the disk;
a transducer to write information to and to read information from the disk;
an actuator to move the transducer across a surface of the disk; and
a controller to control the actuator to move the transducer along a target trajectory by a trajectory seeking control using an acceleration trajectory, wherein a profile of the acceleration trajectory includes an acceleration period, as a track seeking start part, followed by a deceleration period, as a track seeking end part, with the acceleration period including a period where acceleration change according to time becomes and is maintained at zero after proceeding along the target trajectory with a sinusoidally changing acceleration and with the deceleration period including a period where deceleration change according to time becomes and is maintained at zero before proceeding along the target trajectory with a sinusoidally changing deceleration.

9. The disk drive of claim 8, wherein the acceleration trajectory, as characterized by the acceleration period and the deceleration period is symmetrical.

10. The disk drive of claim 8, wherein the period of the acceleration period is a first period of the acceleration period and the acceleration period further comprises a second period following the maintenance of the zero acceleration change after the first period, with the second period proceeding along the target trajectory with a sinusoidal acceleration change to become a zero acceleration before the deceleration period.

11. A computer readable medium having a computer program code stored thereon to move a transducer along a target trajectory by a trajectory seeking control using an acceleration trajectory, wherein a profile of the acceleration trajectory includes an acceleration period, as a track seeking start part, followed by a deceleration period, as a track seeking end part, with the acceleration period including a period where acceleration change according to time becomes and is maintained at zero after proceeding along the target trajectory with a sinusoidally changing acceleration and with the deceleration period including a period where deceleration change according to time becomes and is maintained at zero before proceeding along the target trajectory with a sinusoidally changing deceleration.

12. The computer readable medium of claim 11, wherein the acceleration trajectory, as characterized by the acceleration period and the deceleration period, is symmetrical.

13. The medium of claim 11, wherein the period of the acceleration period is a first period of the acceleration period and the acceleration period further comprises a second period following the maintenance of the zero acceleration change after the first period, with the second period proceeding along the target trajectory with a sinusoidal acceleration change to become a zero acceleration before the deceleration period.

14. A method of acceleration-based track seeking servo control of a disk drive, comprising moving a transducer along a target trajectory by a trajectory seeking control that supplies a voice coil with current and using an acceleration trajectory, wherein a profile of the acceleration trajectory includes an acceleration period, as a track seeking start part, —followed by a deceleration period, as a track seeking end part, —with the acceleration period including a period where an acceleration change according to time becomes and is maintained at zero after proceeding along the target trajectory with a sinusoidally changing acceleration and with the deceleration period including a period where deceleration change according to time becomes and is maintained at zero before proceeding along the target trajectory with a sinusoidally changing deceleration.

15. The method of claim 14, wherein the acceleration trajectory of the current, as characterized by the acceleration period and the deceleration period, is symmetrical.

16. The method of claim 14, wherein the trajectory of the current has a coast period where a specific current is used during constant periods of an acceleration period and a deceleration period, respectively.

17. The method of claim 14, wherein the period of the acceleration period is a first period of the acceleration period and the acceleration period further comprises a second period following the maintenance of the zero acceleration change after the first period, with the second period proceeding along the target trajectory with a sinusoidal acceleration change to become a zero acceleration before the deceleration period.

18. A disk drive comprising:
a disk to store predetermined information;
a spindle motor to rotate the disk;
a transducer to write information to and to read information from the disk;
an actuator to move the transducer across a surface of the disk; and
a controller to control the actuator to move the transducer from a current track along a target trajectory by supplying a voice coil with current and using an acceleration trajectory, wherein a profile of the acceleration trajectory includes an acceleration period, as a track seeking start part, followed by a deceleration period, as a track seeking end part, with the acceleration period including a period where an acceleration change according to time becomes and is maintained at zero after proceeding along the target trajectory with a sinusoidally changing acceleration and with the deceleration period including a period where deceleration change according to time becomes and is maintained at zero before proceeding along the target trajectory with a sinusoidally changing deceleration.

19. The disk drive of claim 18, wherein the acceleration trajectory of the current, as characterized by the acceleration period and the deceleration period, is symmetrical.

20. The disk drive of claim 18, wherein the trajectory of the current has a coast period where a specific current is used during constant periods of an acceleration period and a deceleration period, respectively.

21. The disk drive of claim 18, wherein the period of the acceleration period is a first period of the acceleration period and the acceleration period further comprises a second period following the maintenance of the zero acceleration change after the first period, with the second period proceeding along the target trajectory with a sinusoidal acceleration change to become a zero acceleration before the deceleration period.

22. A computer program product comprising a computer readable medium having stored thereon a computer program code to move a transducer along a target trajectory by a trajectory seeking control using an acceleration trajectory, wherein a profile of the acceleration trajectory includes an acceleration period, as a track seeking start part, followed by a deceleration period, as a track seeking end part, with the acceleration period including a period where acceleration change according to time becomes and is maintained at zero after proceeding along the target trajectory with a sinusoidally changing acceleration and with the deceleration period including a period where deceleration change according to time becomes and is maintained at zero before proceeding along the target trajectory with a sinusoidally changing deceleration.

23. The computer program product of claim 22, wherein the acceleration trajectory of the current, as characterized by the acceleration period and the deceleration period, is symmetrical.

24. The computer program product of claim 22, wherein the trajectory of the current has a coast period where a specific current is used during constant periods of an acceleration period and a deceleration period, respectively.

25. The medium of claim 22, wherein the period of the acceleration period is a first period of the acceleration period and the acceleration period further comprises a second period following the maintenance of the zero acceleration change after the first period, with the second period proceeding along the target trajectory with a sinusoidal acceleration change to become a zero acceleration before the deceleration period.

26. A method of acceleration-based track seeking servo control of a disk drive, wherein a transducer is moved via a voice coil along a target track by a track seeking control using an acceleration trajectory of a function where acceleration value change is zero at the start and end of track seeking, the method comprising:
    determining an acceleration compensation value, which is based upon a difference between a design acceleration value of the transducer and an actual acceleration value of the transducer;
    amplifying the acceleration compensation value; and
    changing an amount of current supplied to the voice coil according to the amplified acceleration compensation value.

27. The method according to claim 26, further comprising changing an acceleration of movement of the transducer after the amount of current supplied to the voice coil is changed.

28. The method according to claim 26, wherein the determining comprises:
    determining a position compensation value, which is based upon a difference between a design position value of the transducer and an actual position value of the transducer;
    determining a velocity compensation value, which is based upon a difference between a design velocity value of the transducer, an actual velocity value of the transducer, and the position compensation value; and
    adding the velocity compensation value to the design acceleration value and subtracting an actual acceleration value of the transducer from the addition result.

29. The method according to claim 28, wherein the determining a velocity compensation value comprises:
    adding a design velocity value to the position compensation value and subtracting an actual velocity value from the addition result; and
    multiplying a difference between the design velocity value and the actual velocity value by a velocity gain.

30. The method according to claim 28, wherein the determining a position compensation value comprises:
    subtracting an actual position value from a design position value; and
    multiplying a difference between the actual position value and the design position value by a position gain.

31. The method of claim 26, wherein the acceleration trajectory is characterized in that acceleration and deceleration are symmetrical.

32. The method of claim 26, further comprising a profile of the acceleration trajectory includes an acceleration period and a deceleration period, each including a period where acceleration change is zero.

33. The method of claim 32, wherein the acceleration trajectory is obtained by integrating a jerk equation j(t) as follows, $$j(t) = K_A I_M \frac{2n\pi}{T_{SK}} \sin\left(\frac{2n\pi}{T_{SK}} t\right), \ 0 < t < \frac{T_{SK}}{n}, \ \frac{T_{SK}}{2} - \frac{T_{SK}}{n} < t < \frac{T_{SK}}{2}$$

$$j(t) = 0, \ \frac{T_{SK}}{n} < t < \frac{T_{SK}}{2} - \frac{T_{SK}}{2}, \ \frac{T_{SK}}{2} + \frac{T_{SK}}{n} < t < T_{SK} - \frac{T_{SK}}{n}$$

$$j(t) = -K_A I_M \frac{2n\pi}{T_{SK}} \sin\left(\frac{2n\pi}{T_{SK}} t\right), \ \frac{T_{SK}}{2} < t < \frac{T_{SK}}{2} + \frac{T_{SK}}{n},$$

$$T_{SK} - \frac{T_{SK}}{2} < t < T_{SK}$$

where $K_A$, $I_M$, and $T_{SK}$ represent an acceleration coefficient, a current amplitude, and a track seek time, respectively, and n is a number of equal intervals into which the seek period is divided.

34. An apparatus for acceleration-based track-seeking servo control of a transducer of a hard disk drive having a voice coil, the apparatus comprising:
    a seek trajectory generator to calculate a design position value, a design velocity value, and a design acceleration value via an acceleration trajectory equation where acceleration change is zero at a start and an end of track seeking in a track seek mode;
    a state estimator to determine actual position, velocity, and acceleration values of the transducer as the transducer moves during the acceleration-based track-seeking;
    a three-stage summing and multiplying unit to obtain an acceleration compensation value, which is based upon the actual position, velocity, and acceleration values, and represents a difference between the actual acceleration value and a design acceleration value; and
    an actuator to generate a current supplied to the voice coil in accordance with the acceleration compensation value.

35. The apparatus according to claim 34, wherein the acceleration trajectory is characterized in that acceleration and deceleration are symmetrical.

36. The apparatus according to claim 34, further comprising a profile of the acceleration trajectory includes an acceleration period and a deceleration period, each including a period where acceleration change is zero.

* * * * *

UNITED STATES PATENT AND TRADEMARK OFFICE
CERTIFICATE OF CORRECTION

PATENT NO.         : 7,359,140 B2                                              Page 1 of 1
APPLICATION NO.    : 10/848167
DATED              : April 15, 2008
INVENTOR(S)        : Da-woon Chung It is certified that error appears in the above-identified patent and that said Letters Patent is hereby corrected as shown below:

Column 12, Line 25, change "$I_M$" to --$I_{M_2}$--.

Signed and Sealed this

Twenty-third Day of February, 2010

David J. Kappos
*Director of the United States Patent and Trademark Office*